Dec. 18, 1951     P. G. VICARD     2,579,282
DEVICE FOR THE TREATMENT OF GASES
Filed Nov. 18, 1947
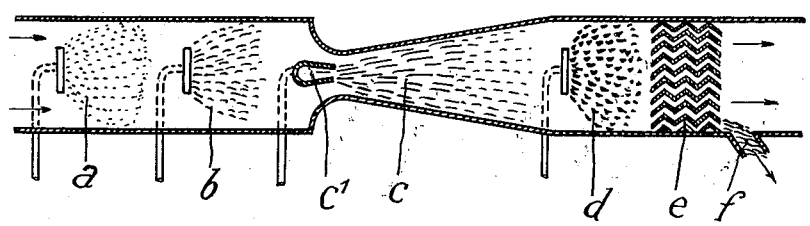
INVENTOR
Pierre Georges Vicard
BY Michael S. Striker
Agt.

Patented Dec. 18, 1951

2,579,282

UNITED STATES PATENT OFFICE 2,579,282

DEVICE FOR THE TREATMENT OF GASES

Pierre Georges Vicard, Lyon, France

Application November 18, 1947, Serial No. 786,680
In France December 6, 1946

Section 1, Public Law 690, August 8, 1946
Patent expires December 6, 1966

3 Claims. (Cl. 183—29)

The present invention has for its object the treatment of gases and, more particularly, cleansing of gases and removal of dust and suspended minute particles of foreign matter, from gases. Such dust and foreign matter, owing to their extreme tenuity, cannot be separated from said gases by any of the means already known, such as, depositing tanks, cyclones, filters, etc. Clean gases may thus be obtained, and by the present invention the dust and particles are quickly and economically separated and extracted from gases by means of a continuous process, no interruption of the work being necessary for cleaning the apparatus in which the gas is treated.

The apparatus of the invention consists essentially in a device for submitting the gas to be treated to the following sequence of operations:

1. The gas is first saturated with water vapour.

2. This gas, saturated with water vapour, is next supersaturated by incorporating therein a dense water fog.

3. This gas, saturated with water vapour and supersaturated with water fog, is submitted to a sudden cooling sufficient to bring about to the very core of its mass the condensation of part of the water vapour. This condensation takes place around the dust or other particles which act as nuclei, in the midst of the gas already supersaturated with water vapour, so as to break up the state of supersaturation. The tiniest particles of dust, even those having no affinity for water whatever, are in this manner, surrounded by the condensation.

This gas, is then washed by an abundant shower of small drops transforming the vapour into small dust containing drops of a given volume which are then easily separated from the gas treated and eliminated with the water used for washing.

To sum up, the purification of the gas is obtained by transforming dry, impalpable dust having no appreciable weight of its own, first into a dust containing vapour, next into small dust containing drops which can then be easily removed by a simple drops separator and carried off together with the cleansing water.

The device used for carrying out the process specified above is diagrammatically illustrated on the accompanying drawing, which is only given as an example. It consists in a unit in which the gas to be purified arrives from the direction shown by the arrows seen on the left of the drawing and through which the gas is made to circulate by any appropriate means. The gas passes through the succeeding parts shown in the drawing. These parts are the following:

A moistening chamber $a$ in which water is sprayed as a very thin fog and evaporates, thus saturating the gas to be treated with water vapour.

A second moisture chamber $b$, similar to the first and in which water, sprayed likewise as a very thin fog and unable to further evaporate, remains in suspension in the form of water fog.

A converging-diverging body $c$, known as a Venturi tube, transforming in its converging part some of the atmospheric pressure of the gas into dynamic pressure with the resulting lowering of the static pressure bringing about evenly and to the very midst of the gaseous mass a sudden drop of temperature. In order to prevent the dust-laden fog thus obtained at the most narrow part of the Venturi tube from evaporating in the diverging part, an injection of drops of cold water is made in the proper quantity and at the proper spot about the neck of the Venturi tube, by means of a nozzle $c'$ for instance, so as to keep the temperature in said diverging part at the low level already obtained.

A chamber $d$ in which water is again sprayed in small drops, in order to bring down the dust containing fog and turn it into dust-laden drops. A filter $e$ made of corrugated sheets placed at the outlet of the chamber $d$ to retain the drops mentioned above.

An outlet, such as $f$, may carry away the dust containing water resulting from the joining of the dust containing drops running down the separator $e$ and the spraying water.

The cleansed gas, on the other hand, leaves the apparatus in the direction shown by the arrows on the right of the drawing. The process and the device described above may be used for any gas and for any particles or dust in suspension in any gas by simply replacing the water by a liquid appropriate to the treatment of a particular gas or to particular dust or particles suspended therein. The invention may moreover be applied to the conditioning of air or to its sterilization, the spores and microbes constituting condensation nuclei for the liquid used. The liquid should be antiseptic or aseptic, if possible.

The invention may be applied not only to the cleansing of a gas, but also to incorporating in a given liquid particles suspended in a gas, the product being collected at $f$.

It should, therefore, be understood that the invention applies to any gas, also to any kind of particles or dust in suspension in said gas; that the vapors, fogs, spraying, washing, or extracting liquids may be of any nature appropriate to said gases and to the particles contained in it; and that the process and device according to the invention can be applied on the one hand for the purification of gases from particles contained therein, and on the other hand for the incorporation of such particles in a liquid as practiced in extraction processes.

What I claim as new and desire to secure by Letters Patent, is:

1. A device for treating gases with a liquid for removing minute particles suspended in the gases comprising in combination, a plurality of successive sections of treatment including a first chamber into which said gases are conducted; spraying means in said first chamber for saturating said gases with the vapor of said treating liquid; a second chamber in communication with and adjoining said first chamber for receiving the saturated gases therefrom; spraying means for spraying said liquid into said second chamber to supersaturate said gases and produce a mist in said second chamber; a Venturi tube arranged next to and communicating with said second chamber to receive the supersaturated gases therefrom, whereby the neck portion of said Venturi tube suddenly cools said separated gases so that the particles of liquid of said mist condense onto the particles suspended in said gases; a third chamber in communication with said Venturi tube to receive the liquid and gas mixture therefrom; means for spraying said liquid into said third chamber so as to cause a separation between the gaseous and liquid phases of said mixture in said third chamber; and means for removing said separated liquid phase from said gaseous phase.

2. A device for treating gases with a liquid for removing minute particles suspended in the gases comprising, in combination, a plurality of successive sections of treatment including a first chamber into which said gases are conducted; spraying means in said first chamber for saturating said gases with the vapor of said treating liquid; a second chamber in communication with and adjoining said first chamber to receive the saturated gases therefrom; means for spraying said liquid into said second chamber so as to supersaturate said gases and produce a mist in said second chamber; a Venturi tube arranged next to and in communication with said second chamber to receive the supersaturated gases therefrom, whereby the neck portion of said Venturi tube suddenly cools said supersaturated gases so that the liquid particles of said mist condense onto the particles suspended in said gases; a third chamber arranged in communication with said Venturi tube to receive the liquid and gas mixture therefrom; means for spraying said liquid into said third chamber so as to cause a separation between the gaseous and liquid phases of said mixture; and a filtering means placed at the outlet of said third chamber for retaining the liquid phase, while allowing the gases to pass through.

3. A device for treating gases with a liquid for removing minute particles suspended in the gases comprising in combination, a plurality of successive sections of treatment including a first chamber into which said gases are conducted; spraying means in said chamber for saturating said gases with the vapor of said treating liquid; a second chamber in communication with and adjoining said first chamber to receive the saturated gases therefrom; means for spraying said liquid into said second chamber so as to supersaturate said saturated gases and produce a mist in said second chamber; a Venturi tube in communication with said second chamber to receive the liquid and gas mixture therefrom, whereby the neck portion of said Venturi tube suddenly cools said gases so that the liquid particles of said mist condense onto the particles suspended in said gases; a third chamber arranged in communication with said Venturi tube to receive said mixture therefrom; means for spraying said liquid into said third chamber so as to cause a separation between the gaseous and liquid phases of said mixture; a filtering means placed at the outlet of said third chamber for retaining the liquid phase, while allowing the gases to pass through; means for collecting and carrying off said liquid; and an outlet opening for the escape of said gases free of suspended particles.

PIERRE GEORGES VICARD.

REFERENCES CITED

The following references are of record in the file of this patent:

UNITED STATES PATENTS

| Number | Name | Date |
|---|---|---|
| 1,713,175 | Fast | May 14, 1929 |
| 1,940,198 | Wagner | Dec. 19, 1933 |
| 2,307,292 | Palmer | Jan. 5, 1943 |